US011981130B2

(12) United States Patent
Masuoka et al.

(10) Patent No.: US 11,981,130 B2
(45) Date of Patent: May 14, 2024

(54) PRINTER, CONTROL METHOD, AND NON-TRANSITORY COMPUTER-READABLE MEDIUM STORING COMPUTER-READABLE INSTRUCTIONS

(71) Applicant: BROTHER KOGYO KABUSHIKI KAISHA, Nagoya (JP)

(72) Inventors: Ko Masuoka, Miyoshi (JP); Katsunori Nishida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 202 days.

(21) Appl. No.: 17/586,255

(22) Filed: Jan. 27, 2022

(65) Prior Publication Data

US 2022/0274401 A1 Sep. 1, 2022

(30) Foreign Application Priority Data

Feb. 26, 2021 (JP) ................................ 2021-030219

(51) Int. Cl.

| | |
|---|---|
| ***B41J 2/045*** | (2006.01) |
| ***B41J 29/377*** | (2006.01) |
| ***B41J 29/38*** | (2006.01) |
| *B41J 2/165* | (2006.01) |

(52) U.S. Cl.

CPC ....... *B41J 2/04563* (2013.01); *B41J 2/04541* (2013.01); *B41J 29/377* (2013.01); *B41J 29/38* (2013.01); *B41J 2/16508* (2013.01); *B41J 2/16511* (2013.01); *B41J 2202/08* (2013.01)

(58) Field of Classification Search

CPC .. B41J 2/04563; B41J 2/04541; B41J 29/377; B41J 29/38; B41J 2/16508; B41J 2/16511; B41J 2202/08

See application file for complete search history.

(56) References Cited

U.S. PATENT DOCUMENTS

2012/0189325 A1* 7/2012 Kushima ................ G03G 15/00 399/92

FOREIGN PATENT DOCUMENTS

| | | | | |
|---|---|---|---|---|
| JP | 2004345319 A | | 12/2004 | |
| JP | 2005153173 A | * | 6/2005 | ............ B41J 29/377 |
| JP | 2005254619 A | | 9/2005 | |
| JP | 2012154971 A | | 8/2012 | |
| JP | 2012158085 A | | 8/2012 | |

(Continued)

OTHER PUBLICATIONS

Office Action issued in related Japanese Patent Application No. 2021-030219, dated Jan. 23, 2024. (3 pages.).

*Primary Examiner* — Yaovi M Ameh

(74) *Attorney, Agent, or Firm* — K&L Gates LLP

(57) ABSTRACT

A printer is provided with a head configured to discharge ink, a fan configured to cool the head, a sensor configured to output a detection signal indicating a state of the fan. A processer of the printer performs decision processing of deciding print control based on a detection signal output by the sensor. In the decision processing, the processor decides a first print control to drive the fan and control printing by the head in a first print mode, when the detection signal does not indicate a failure state of the fan. In the decision processing, the processor decides a second print control to control the printing by the head in a second print mode suppressing generation of heat more than the first print mode, when the detection signal indicates the failure state of the fan.

14 Claims, 6 Drawing Sheets

(56) References Cited

FOREIGN PATENT DOCUMENTS

| | | | |
|---|---|---|---|
| JP | 2014167949 | A | 9/2014 |
| JP | 2019001035 | A | 1/2019 |

* cited by examiner

FIG. 5

49

| CONTROL CONTENT DEFINITION TABLE | | | |
|---|---|---|---|
| CONTROL CONTENT | FIRST PRINT MODE | SECOND PRINT MODE | |
| | | IMAGE QUALITY PRIORITY MODE | PRODUCTIVITY PRIORITY MODE |
| ENVIRONMENTAL RESTRICTIONS | NO | HEAD TEMPERATURE IS WITHIN REFERENCE TEMPERATURE RANGE (FROM 25 ° C TO 30 ° C) | NO |
| PRINT METHOD | BI-DIRECTIONAL PRINTING | UNI-DIRECTIONAL PRINTING | BI-DIRECTIONAL PRINTING |
| RESOLUTION OF PRINT IMAGE | FIRST RESOLUTION (300 dpi) | FIRST RESOLUTION (300 dpi) | SECOND RESOLUTION (150 dpi) |
| NUMBER OF PULSES | FIRST NUMBER OF PULSES (TRIPLE) | FIRST NUMBER OF PULSES (TRIPLE) | SECOND NUMBER OF PULSES (DOUBLE) |
| CARRIAGE SPEED | FIRST SPEED (1.0 m/sec) | SECOND SPEED (0.5 m/sec) | FIRST SPEED (1.0 m/sec) |
| INTERVAL BETWEEN SCANS | FIRST TIME PERIOD (0.3 secs) | SECOND TIME PERIOD (0.6 secs) | FIRST TIME PERIOD (0.3 secs) |
| HEAD DRIVE VOLTAGE CONTROL METHOD | CONSTANT CONTROL | CONTROL IN ACCORDANCE WITH HEAD TEMPERATURE | CONTROL IN ACCORDANCE WITH HEAD TEMPERATURE |
| NON-PRINTING SCANNING IN ACCORDANCE WITH HEAD TEMPERATURE | NO | HEAD TEMPERATURE IS HIGHER THAN REFERENCE TEMPERATURE (30° C) | NO |
| NON-PRINTING SCANNING AFTER END OF PRINTING | NO | YES | YES |

PRINTER, CONTROL METHOD, AND NON-TRANSITORY COMPUTER-READABLE MEDIUM STORING COMPUTER-READABLE INSTRUCTIONS

CROSS-REFERENCE TO RELATED APPLICATION

This application claims priority to Japanese Patent Application No. 2021-030219 filed Feb. 26, 2021. The contents of the foregoing application are hereby incorporated herein by reference.

BACKGROUND

The present disclosure relates to a printer, a control method, and a non-transitory computer-readable medium storing computer-readable instructions.

A printer is provided with a head and a fan. The head discharges ink onto a print medium. The fan cools the head as a result of the fan being driven.

SUMMARY

In the above-described printer, there is a case in which cooling of the head by the fan is difficult due to failure of the fan. In this case, fluidity of the ink inside the head changes, and there is a possibility that an ink discharge failure by the head may occur.

Embodiments of the broad principles derived herein provide a printer, a control method, and a non-transitory computer-readable medium storing computer-readable instructions, which are capable of suppressing an ink discharge failure by a head.

A first aspect of the present disclosure relates to a printer. The printer includes a head configured to discharge ink, a fan configured to cool the head, a sensor configured to output a detection signal indicating a state of the fan, a processor, and a memory storing computer-readable instructions that, when executed by the processor, instruct the processor to perform processes. The processes include decision processing of deciding print control based on the detection signal output by the sensor. The decision processing includes deciding a first print control to drive the fan and control printing by the head in a first print mode, when the detection signal does not indicate a failure state of the fan. The decision processing includes deciding a second print control to control the printing by the head in a second print mode suppressing generation of heat more than the first print mode, when the detection signal indicates the failure state of the fan. The processes include print control processing of performing the print control decided by the decision processing.

When the failure state of the fan is detected, in the second print control, the printing by the head is controlled in the second print mode. In the second print mode, the generation of heat is suppressed more than in the first print mode. Thus, the printer can suppress a discharge failure of ink by the head.

A second aspect of the present disclosure relates to a control method for a printer. The control method includes decision processing of deciding print control based on a detection signal output by a sensor configured to output the detection signal indicating a state of a fan cooling a head configured to discharge ink. The decision processing includes deciding a first print control to drive the fan and control printing by the head in a first print mode, when the detection signal does not indicate a failure state of the fan.

The decision processing decides a second print control to control the printing by the head in a second print mode that suppresses generation of heat more than the first print mode, when the detection signal indicates the failure state of the fan. The control method includes print control processing of performing the print control decided by the decision processing.

The second aspect can achieve the same effects as those of the first aspect.

A third aspect of the present disclosure relates to a non-transitory computer-readable medium storing computer-readable instructions that, when executed by a computer of a printer, instruct the computer to perform processes. The processes include decision processing of deciding print control based on a detection signal output by a sensor configured to output the detection signal indicating a state of a fan cooling a head configured to discharge ink. The decision processing includes deciding a first print control to drive the fan and control printing by the head in a first print mode, when the detection signal does not indicate a failure state of the fan. The decision processing includes deciding a second print control to control the printing by the head in a second print mode that suppresses generation of heat more than the first print mode, when the detection signal indicates the failure state of the fan. The processes include print control processing of performing the print control decided by the decision processing.

The third aspect can achieve the same effects as those of the first aspect.

BRIEF DESCRIPTION OF THE DRAWINGS

Embodiments will be described below in detail with reference to the accompanying drawings in which:

FIG. 5 is a concept diagram showing a control content definition table;

DETAILED DESCRIPTION

Figure 1:
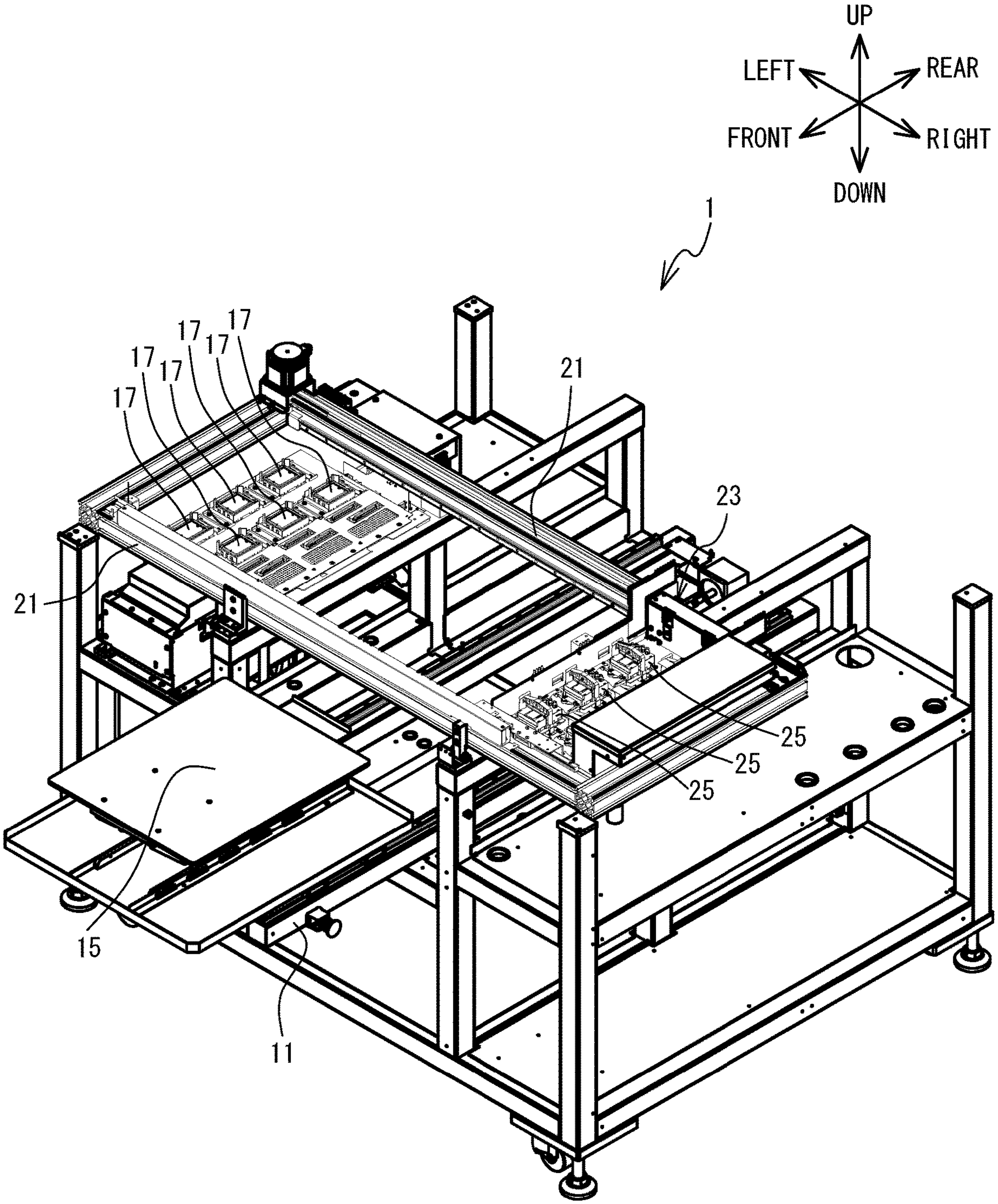
FIG. 1 is a perspective view of a printer as seen from front right and above.

With reference to the drawings, a printer 1 according to an embodiment of the present disclosure will be described. A lower left side, an upper right side, a lower right side, an upper left side, an upper side, and a lower side correspond to a front side, a rear side, a right side, a left side, an upper side, and a lower side of the printer 1, respectively. In the present embodiment, mechanical elements in the drawings are illustrated in accordance with an actual scale.

As illustrated in FIG. 1, the printer 1 is provided with a conveyer 11 and a pair of guide rails 21. The conveyer 11 extends in a front-rear direction, and supports a platen 15. The print medium (not illustrated in the drawings) is placed on the upper surface of the platen 15. The print medium is a fabric, paper, or the like, and is, for example, a T-shirt. The platen 15 is conveyed in the front-rear direction along the conveyer 11 by the driving of a sub-scanning motor 32 illustrated in FIG. 3. Thus, in the present embodiment, the front-rear direction is a sub-scanning direction.

The pair of guide rails 21 extend in the left-right direction, and supports a carriage 23. The carriage 23 is located above the platen 15. The head 25 is mounted on the carriage 23. A number of the heads 25 is not limited to a particular number, but is six as an example. Note that only three of the heads 25 disposed side by side in the front-rear direction are illustrated in FIG. 1. The carriage 23 is conveyed in the left-right direction along the pair of guide rails 21 by the driving of a main scanning motor 31 illustrated in FIG. 3. As a result, the head 25 is also conveyed in the left-right direction. Thus, in the present embodiment, the left-right direction is a main scanning direction.

A cap 17 is provided at a position on the left side of a movement path of the platen 15 and below a movement path of the head 25. A number of the caps 17 corresponds to the number of heads 25, and is six as an example. The caps 17 are disposed at positions corresponding to arrangement positions of the heads 25. The cap 17 is moved in an up-down direction by the driving of a cap motor 33 illustrated in FIG. 3. The cap 17 covers, from below, a nozzle surface 26 (to be described later) of the head 25, as a result of the cap 17 moving upward in a state in which the head 25 is positioned above the cap 17.

Figure 2:
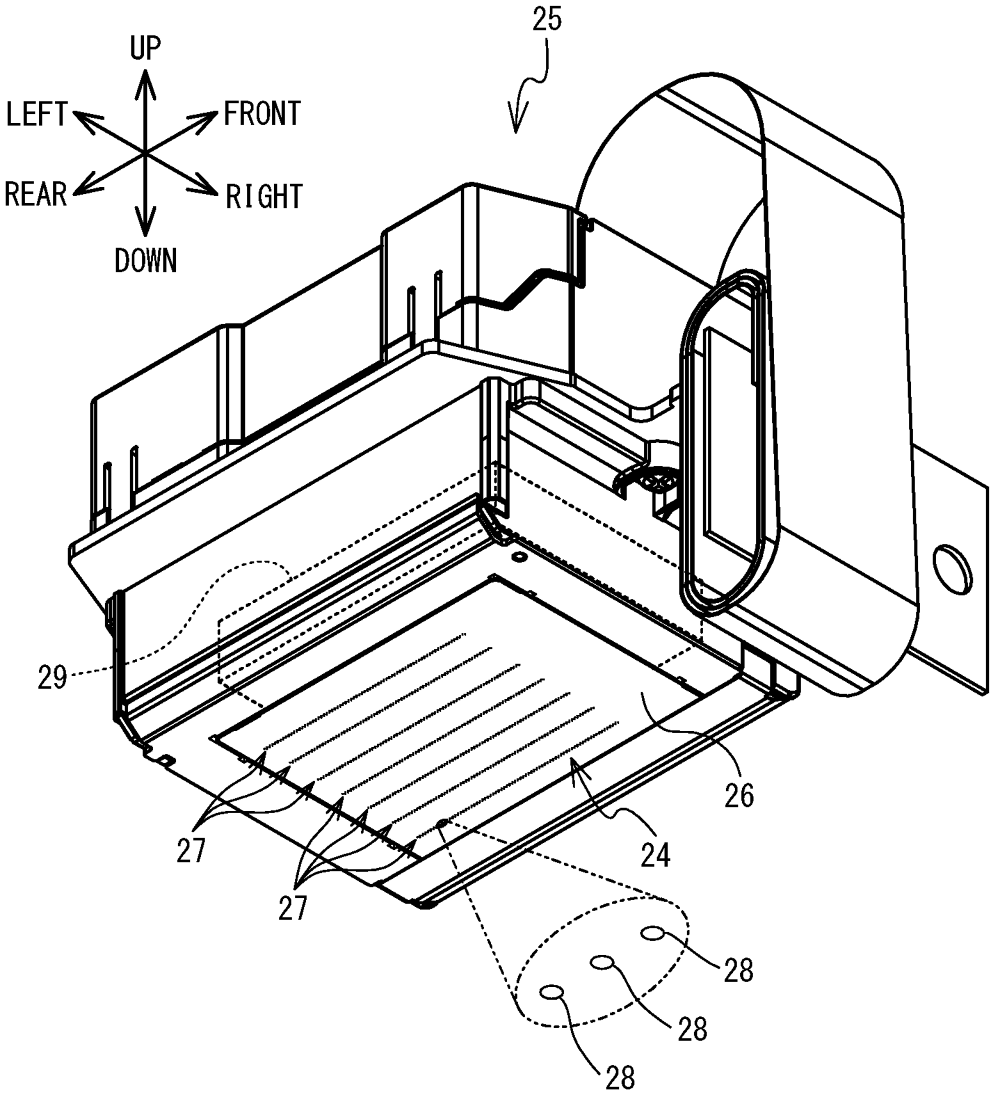
FIG. 2 is a perspective view of a head as seen from front left and below.

As shown in FIG. 2, the head 25 is a cuboid shape, and includes a nozzle plate 24. The nozzle plate 24 is disposed on the lower surface of the head 25. The nozzle surface 26 is formed in the lower surface of the nozzle plate 24. A plurality of nozzle rows 27 are aligned in the left-right direction in the nozzle surface 26. The nozzle rows 27 are configured by a plurality of nozzle openings 28 aligned in the front-rear direction. The head 25 discharges ink from the plurality of nozzle openings 28.

Figure 3:
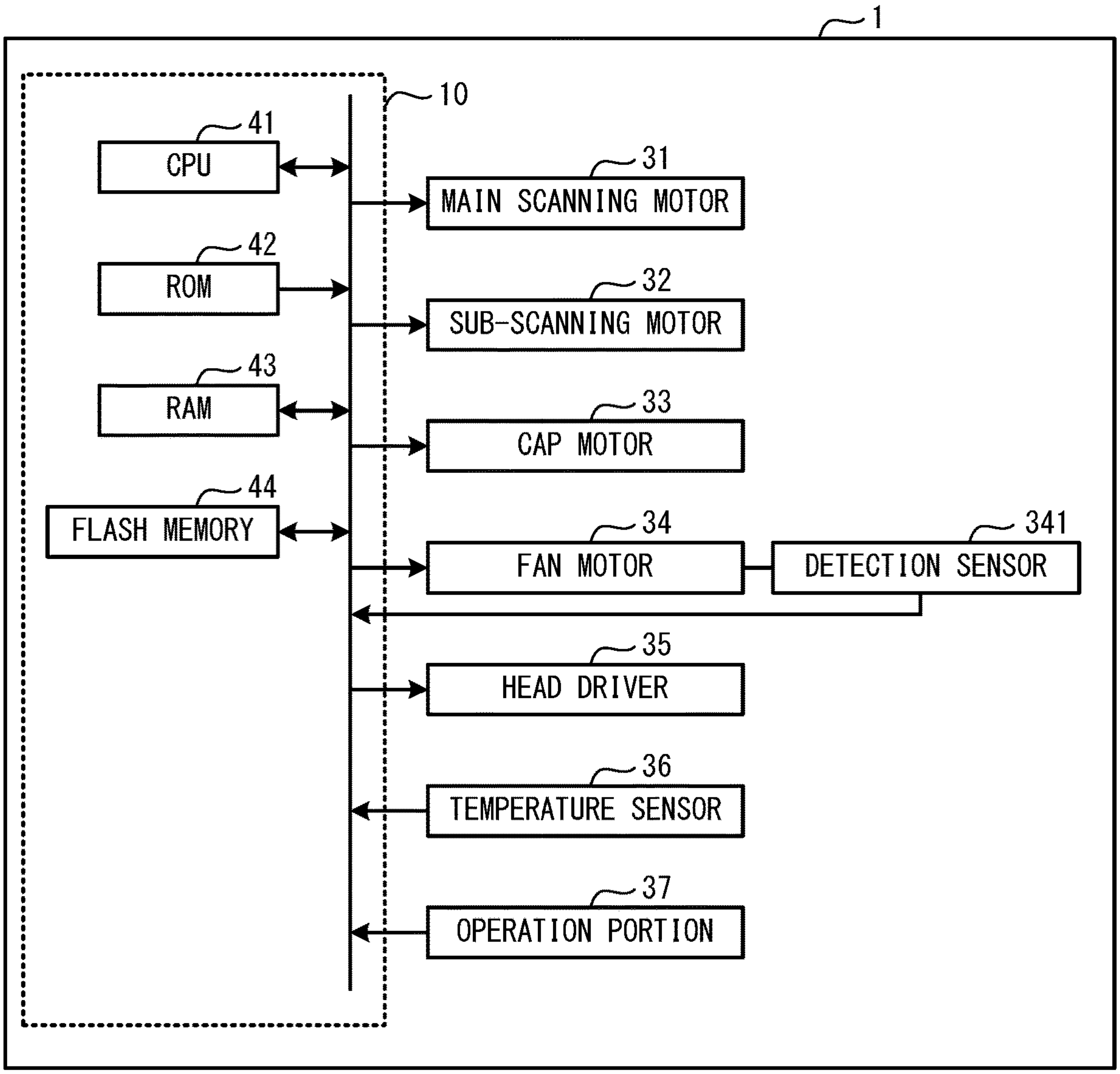
FIG. 3 is a block diagram showing an electrical configuration of the printer.

A fan 29 is provided inside the head 25, above the nozzle plate 24. A fan motor 34 shown in FIG. 3 is built into the fan 29. The fan 29 rotates dues to the driving of the fan motor 34. In this way, the fan 29 blows air toward the nozzle plate 24, and cools the head 25.

According to the configuration described above, the printer 1 causes the platen 15 illustrated in FIG. 1 to move from the front to the rear using the driving of the sub-scanning motor 32 illustrated in FIG. 3. After that, while causing the platen 15 to move from the rear to the front using the driving of the sub-scanning motor 32 illustrated in FIG. 3, the printer 1 causes the carriage 23 to reciprocate in the left-right direction using the driving of the main scanning motor 31 illustrated in FIG. 3. The head 25 discharges the inks from the nozzle openings 28 while scanning in the left-right direction. In this manner, by discharging the inks from the head 25 while conveying the print medium in the front-rear direction and the left-right direction with respect to the head 25, the printer 1 prints a print image on the print medium.

With reference to FIG. 3, an electrical configuration of the printer 1 will be described. The printer 1 is provided with a control board 10. A CPU 41, a ROM 42, a RAM 43, and a flash memory 44 are provided at the control board 10. The CPU 41 controls the printer 1, and is electrically connected to the ROM 42, the RAM 43, and the flash memory 44. The ROM 42 stores a control program for controlling operations of the printer 1, information necessary for the CPU 41 to execute various programs, and the like. The ROM 42 stores a control content definition table 49 to be described later (refer to FIG. 5), for example. The RAM 43 temporarily stores various data and the like used in the control program. The flash memory 44 is non-volatile, and stores print data for performing printing, priority settings to be described later, and the like. The print data represents a dot pattern or the like that forms a print image.

The main scanning motor 31, the sub-scanning motor 32, the cap motor 33, the fan motor 34, a head driver 35, a temperature sensor 36, and an operation portion 37 are electrically connected to the CPU 41. The main scanning motor 31, the sub-scanning motor 32, the cap motor 33, the fan motor 34, and the head driver 35 are driven by control of the CPU 41.

A detection sensor 341 is provided in the fan motor 34. The detection sensor 341 is a lock sensor, for example, and detects a state of the fan 29 by detecting a voltage value. When a current of an amount greater than a predetermined current reference value is flowing through the fan motor 34, for example, the detection sensor 341 detects a voltage value less than the predetermined current reference value. When a current of an amount equal to or smaller than the predetermined current reference value is flowing through the fan motor 34, the detection sensor 341 detects a voltage value equal to or greater than the predetermined current reference value. The detection sensor 341 outputs, to the CPU 41, a detection signal that depends on the voltage value detected by the detection sensor 341. In the present embodiment, a state in which the amount of the current flowing in the fan motor 34 is equal to or smaller than the current reference value is defined as a failure state of the fan 29. The current reference value is not limited to a particular value, but is 0 A, for example. When the voltage value equal to or greater than the current reference value is detected based on the detection value from the detection sensor 341, the CPU 41 detects the failure state of the fan 29.

The CPU 41 controls the head driver 35, and can control whether or not the ink is to be discharged, for each one of the plurality of nozzle openings 28. The head driver 35 is configured, for example, by a drive circuit and a piezoelectric element (a piezoelectric device). The piezoelectric element is provided in each of the plurality of nozzle openings 28 shown in FIG. 2. The CPU 41 outputs a pulse signal (refer to FIG. 4, for example) to the drive circuit of the head driver 35. The drive circuit selectively applies, to the piezoelectric element, a voltage according to a drive waveform of the pulse signal from the CPU 41. Hereinafter, the voltage applied to the piezoelectric element is referred to as a "head drive voltage." In the present embodiment, the head drive voltage is not an accumulated value of the voltage within a predetermined duration, but is a voltage value in a chosen time point. The head drive voltage applied to the piezoelectric element is converted to a pressure. The head 25 shown in FIG. 2 discharges the ink from the nozzle opening 28 in accordance with the pressure by the piezoelectric element.

Figure 4:
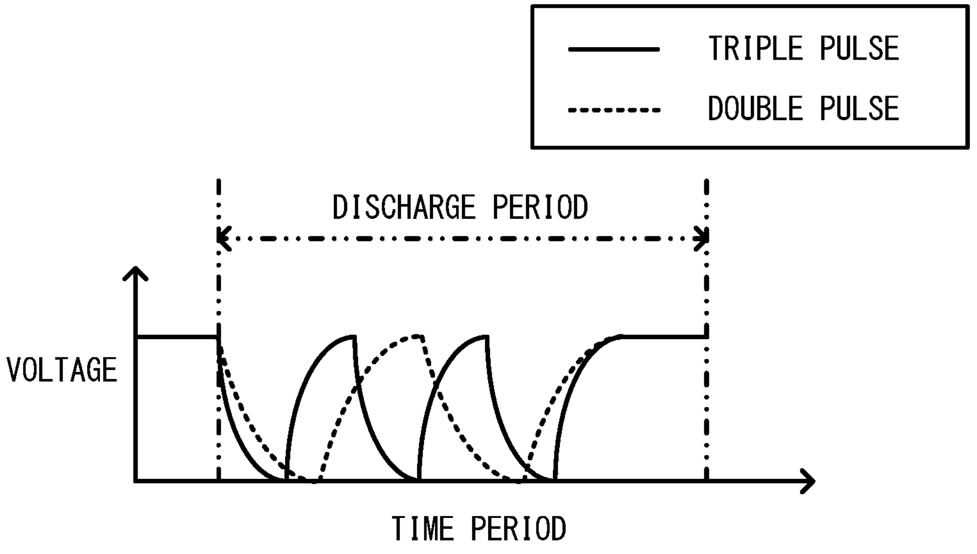
FIG. 4 is a diagram showing a drive waveform of a pulse signal.

Hereinafter, a period forming a single dot on the print medium in the pulse signal is referred to as a "discharge period" (refer to FIG. 4), and a number of pulses included in one of the discharge periods in the pulse signal is simply referred to as a "number of pulses." As an example of the pulse signal, FIG. 4 shows a drive waveform of a pulse signal in which the number of pulses is 2 (hereinafter referred to as a "double pulse") and a drive waveform of a pulse signal in which the number of pulses is 3 (hereinafter referred to as a "triple pulse"). The head 25 forms the single dot on the print medium by discharging the ink from the single nozzle opening 28 a number of times corresponding to the number of pulses. Hereinafter, a number of the dots formed on the print medium by the discharge of the ink by the head 25 is referred to as a "number of dots." The number of dots is not particularly limited, and is a total number of the dots forming the print image on the single print medium.

The temperature sensor 36 is provided inside the head 25, and detects the temperature of the head 25 (hereinafter referred to as a "head temperature"). The temperature sensor 36 is a thermistor, for example. The head temperature is, for example, the temperature of the nozzle surface 26. For example, a substrate is provided above the nozzle surface 26 inside the head 25, and the temperature sensor 36 detects the head temperature by detecting the temperature of the substrate. The operation portion 37 is a touch panel, or the like, and outputs information to the CPU 41 in accordance with an operation by a user. By operating the operation portion 37, the user can input, to the printer 1, a print command for starting the printing by the printer 1, or the like. The print command instructs the start of the printing on the single print medium, for example, and specifies print data that is a control target.

In the printer 1 of the above-described configuration, when the fan 29 becomes in the failure state in a state in which the head 25 can be used, in order to suppress the discharge failure of the ink by the head 25, it is necessary to suppress an increase in the head temperature. In order to suppress the increase in the head temperature, it is necessary to reduce power consumption by the head 25 from one print command to the next print command. In the present embodiment, the time period from the one print command to the next print command is referred to as a "processing time period," and the power consumption of the head 25 during the processing time period is referred to as "head power consumption." The head power consumption is represented by the following formula, for example:

Head power consumption[$W$]={(head drive voltage [$V$])^2}×electrostatic capacitance of piezoelectric element[$F$]×number of pulses×number of dots/processing time period [sec]

The electrostatic capacitance of the piezoelectric element is a physical property of the piezoelectric element. Thus, the printer 1 cannot change the electrostatic capacitance by changing the print control. On the other hand, the printer 1 can increase or decrease the head drive voltage, the number of pulses, the number of dots, and the processing time period, by changing the print control.

According to the above-described formula, the printer 1 can reduced the head power consumption by decreasing the head drive voltage. The printer 1 can reduce the head power consumption by reducing the number of pulses. The printer 1 can reduce the head power consumption by reducing the number of dots. The printer 1 can reduce the head power consumption by increasing the processing time period.

The control content definition table 49 will be explained with reference to FIG. 5. The control content definition table 49 sets out control content of the printing by the head 25, in accordance with print modes. The print modes are modes for deciding the control content of the printing by the head 25, and are divided into a first print mode and a second print mode.

The first print mode is a predetermined print mode. The second print mode is a print mode that suppresses the generation of heat more than the first print mode, and is further divided into an image quality priority mode and a productivity priority mode. The image quality priority mode is a print mode that suppresses the generation of heat more than in the first print mode, while inhibiting an image quality of the print image from deteriorating more than in the first print mode. The productivity priority mode is a print mode that suppresses the generation of heat more than in the first print mode, while inhibiting a printing productivity from deteriorating more than in the first print mode.

The image quality priority mode is a print mode in which the image quality of the print image is higher than in the productivity priority mode. The image quality priority mode is the print mode that suppresses the generation of heat more than in the first print mode, by reducing the printing productivity compared to the first print mode. The productivity priority mode is a print mode in which the printing productivity is higher than in the image quality priority mode. The productivity priority mode is the print mode that suppresses the generation of heat more than in the first print mode, by reducing the image quality of the print image compared to the first print mode.

Environmental restrictions, a print method, a resolution of the print image, the number of pulses, a carriage speed, an interval between scans, a head drive voltage control method, non-printing scanning depending on the head temperature, and non-printing scanning after ending the printing are set as the control content of the control content definition table 49, for example. In the present embodiment, based on the first print mode or the second print mode that has been selected, all the control content set for each of the print modes is performed, that is all of the environmental restrictions, the print method, the resolution of the print image, the number of pulses, the carriage speed, the interval between scans, the head drive voltage control method, the non-printing scanning depending on the head temperature, and the non-printing scanning after ending the printing are performed.

Hereinafter, as an example, a time point at which the print command is input is a "printing start," and a time point at which all of the print image has been printed on the print medium is as a "printing end." The printing end is a time point at which the last ink is discharged, in the printing on the single print medium. A period from the printing start to the printing end is referred to as "during the printing." In a comparison of each of the print modes, it is assumed that the print control is performed on the basis of the same print data.

Environmental Restrictions

The environmental restrictions indicate whether or not the performing of the print control is to be decided depending on the head temperature, and indicate a reference temperature range of the head temperature when the performing of the print control is to be decided depending on the head temperature. In the environmental restrictions, the control content definition table 49 sets out "No" for the first print mode and the productivity priority mode, and sets out "Head temperature within reference temperature range" for the image quality priority mode, for example. "No" indicates that the performing of the print control is not to be decided depending on the head temperature. "Head temperature within reference temperature range" indicates a decision that the print control is to be performed when the head temperature is within the reference temperature range, and the print control is not to be performed when the head temperature is outside the reference temperature range. The reference temperature range is not limited to a particular temperature range, and is from 25° C. to 30° C., for example. When the head temperature is outside the reference temperature range, the printer 1 stands by until the head temperature is within the reference temperature range. In other words, the print control is performed as long as the head temperature is within the reference temperature range. Thus, when there is a standby time period, the processing time period is lengthened by an amount corresponding to the standby time period. As a result, in the image quality priority mode, due to the increase in the processing time period caused by the environmental restrictions, the head power consumption may be reduced compared to the first print mode. In the image quality priority mode, the image quality of the print image is unlikely to deteriorate more than in the first print mode as a result of the environmental restrictions. Thus, in this case, the image quality of the print image is less likely to deteriorate in the image quality priority mode than in the productivity priority mode.

Print Method

In the print method, the control content definition table 49 sets out bi-directional printing for the first print mode and the productivity priority mode, and sets out uni-directional printing for the image quality priority mode, for example. Hereinafter, scanning in which the plurality of heads 25 move in the main scanning direction while at least one of the heads 25 discharges the ink is referred to as "discharge scanning" or a "discharge scan," and scanning in which all of the heads 25 move in the main scanning direction without discharging the ink is referred to as "non-printing scanning," or a "non-printing scan." The bi-directional printing is a print method of performing the discharge scanning, in the main scanning direction, on both a forward pass and a return pass. The uni-directional printing is a print method of performing the discharge scanning, in the main scanning direction, on one of the forward pass or the return pass, and performing the non-printing scanning on the other of the forward pass or the return pass.

In the first print mode, the bi-directional printing is performed, and thus, during the printing, the number of times that the non-printing scanning is performed is zero, for example. On the other hand, in the image quality priority mode, the uni-directional printing is performed, and thus, during the printing, half of the number of scans of the heads 25 is the non-printing scanning. As a result, in the image quality priority mode, the non-printing scanning is performed a greater number of times than in the first print mode. When the number of times that the non-printing scanning is performed is large, the processing time period becomes longer. Thus, in the image quality priority mode, the head power consumption is reduced compared to the first print mode, as a result of the increase in the processing time period due to the print method. An increase in the non-printing scanning is not likely to have an impact on the image quality of the print image. Thus, in the image quality priority mode, the image quality of the print image is unlikely to deteriorate more than in the first print mode as a result of the print method. Thus, in this case, the image quality of the print image is less likely to deteriorate in the image quality priority mode than in the productivity priority mode. Note that, in the present embodiment, as the number of scans, the forward pass or the return pass in the scanning of the heads 25 is counted as one time. In other words, the number of scans for the forward and return scan by the heads 25 is two times.

Print Resolution

For the resolution of the print image, the control content definition table 49 sets out a first resolution for the first print mode and the image quality priority mode, and sets out a second resolution for the productivity priority mode, for example. The first resolution is not limited to a particular resolution, but is 300 dpi, for example. The second resolution is not limited to a particular resolution, but is lower than the first resolution, and is 150 dpi, for example.

For example, the number of nozzle openings 28 that discharge the ink is defined as a "number of discharge nozzles." For the resolution of the print image, for example, the number of scans in the productivity priority mode is the same as the number of scans in the first print mode, and the number of discharge nozzles per scan of the heads 25 in the productivity priority mode is half the number of discharge nozzles per scan of the heads 25 in the first print mode. For example, the printer 1 alternately sets the nozzle openings 28 that discharge the ink, and the nozzle openings 28 that do not discharge the ink, in the single nozzle row 27. Alternatively, of the plurality of nozzle rows 27, the printer 1 alternately sets the nozzle row 27 that discharges the ink and the nozzle row 27 that does not discharge the ink. In this way, the number of dots per scan of the heads 25 in the productivity priority mode becomes half the number of dots per scan of the heads 25 in the first print mode. Furthermore, the number of scans in the productivity priority mode is the same as the number of scans in the first print mode. Thus, the resolution in the productivity priority mode is half the resolution in the first print mode.

As described above, the number of dots in the second print mode is smaller than the number of dots in the first print mode. Thus, in the productivity priority mode, due to the reduction in the number of dots, the head power consumption is reduced compared to the first print mode. The number of scans in the productivity priority mode is the same as the number of scans in the first print mode. Thus, in the productivity priority mode, the printing productivity is unlikely to deteriorate more than in the first print mode as a result of the reduction in the number of dots. As a result, in this case, the printing productivity is less likely to deteriorate in the productivity priority mode than in the image quality priority mode.

For the resolution of the print image, for example, the number of scans in the image quality priority mode is twice the number of scans in the first print mode, and, in a similar manner to the productivity priority mode, the number of discharge nozzles per scan of the heads 25 in the image quality priority mode is half the number of discharge nozzles per scan of the heads 25 in the first print mode. In this way, the number of dots per scan of the heads 25 in the image quality priority mode is half the number of dots per scan of the heads 25 in the first print mode. Furthermore, the number of scans in the image quality priority mode is twice the number of scans in the first print mode. Thus, the resolution in the image quality priority mode and the resolution in the first print mode are the same. As a result, in the image quality priority mode, the image quality of the print image is unlikely to deteriorate more than in the first print mode as a result of the increase in the number of scans. Thus, in this case, the image quality of the print image is less likely to deteriorate in the image quality priority mode than in the productivity priority mode.

As described above, due to the increase in the number of scans, the processing time period in the image quality priority mode is longer than the processing time period in the first print mode. Thus, in the image quality priority mode, due to the increase in the processing time period, the head power consumption is reduced compared to the first print mode.

Number of Pulses

For the number of pulses, the control content definition table 49 sets out a first number of pulses in the first print mode and the image quality priority mode, and sets out a second number of pulses in the productivity priority mode, for example. The first number of pulses is not limited to a particular number of pulses, and is 3, for example. In other words, in the first print mode and the image quality priority mode, the CPU 41 outputs the triple pulse shown in FIG. 4 to the head driver 35. The second number of pulses is not limited to a particular number of pulses, but is smaller than the first number of pulses, and is 2, for example. In other words, in the productivity priority mode, the CPU 41 outputs the double pulse shown in FIG. 4 to the head driver 35. As a result, in the productivity priority mode, due to the reduction in the number of pulses, the head power consumption is reduced compared to the first print mode. The reduction in the number of pulses is unlikely to have an impact on increasing the processing time period. Thus, in the productivity priority mode, the printing productivity is unlikely to deteriorate more than in the first print mode as a result of the reduction in the number of pulses. As a result, in this case, the printing productivity is less likely to deteriorate in the productivity priority mode than in the image quality priority mode.

Carriage Speed

The carriage speed indicates a speed of the carriage 23 when the heads 25 are scanning. For the carriage speed, the control content definition table 49 sets out a first speed in the first print mode and the productivity priority mode, and sets out a second speed in the image quality priority mode, for example. The first speed is not limited to a particular speed, and is 1.0 m/s, for example. The second speed is not limited to a particular speed, but is slower than the first speed, and is 0.5 m/s, for example. When the carriage speed is slower, the processing time period becomes longer. Thus, in the image quality priority mode, due to the increase in the processing time period as a result of the reduction in the carriage speed, the head power consumption is reduced compared to the first print mode. The reduction in the carriage speed is unlikely to have an impact on reducing the image quality of the print image. Thus, in the image quality priority mode, the image quality of the print image is unlikely to deteriorate more than in the first print mode as a result of the reduction in the carriage speed. As a result, in this case, the image quality of the print image is less likely to deteriorate in the image quality priority mode than in the productivity priority mode.

Interval Between Scans

The interval between scans indicates a stop time period of the carriage 23 between the end of one scan by the heads 25 to the start of the next scan by the heads 25. For the interval between scans, the control content definition table 49 sets out a first time period in the first print mode and the productivity priority mode, and sets out a second time period in the image quality priority mode, for example. The first time period is not limited to a particular time period, and is 0.3 seconds, for example. The second time period is not limited to a particular time period, but is longer than the first time period, and is 0.6 seconds, for example. When the interval between scans is longer, the processing time period becomes longer. Thus, in the image quality priority mode, due to the increase in the processing time period as a result of the increase in the interval between scans, the head power consumption is reduced compared to the first print mode. The increase in the interval between scans is unlikely to have an impact on reducing the image quality of the print image. Thus, in the image quality priority mode, the image quality of the print image is unlikely to deteriorate more than in the first print mode as a result of the increase in the interval between scans. As a result, in this case, the image quality of the print image is less likely to deteriorate in the image quality priority mode than in the productivity priority mode.

Head Drive Voltage Control

For the head drive voltage control method, the control content definition table 49 sets out "constant control" for the first print mode, and sets out "control according to head temperature" for the image quality priority mode and the productivity priority mode, for example. The "constant control" indicates a method that controls the head drive voltage regardless of the head temperature. The "control according to head temperature" indicates a method that lowers the head drive voltage when the head temperature has increased, and raises the head drive voltage when the head temperature has decreased. In the productivity priority mode, the head power consumption may decrease compared to the first print mode, due to a reduction in the head drive voltage resulting from the increase in the head temperature. The reduction in the head drive voltage is unlikely to have an impact on increasing the processing time period. Thus, in the productivity priority mode, the printing productivity is unlikely to deteriorate more than in the first print mode as a result of the reduction in the head drive voltage. The reduction and increase in the head drive voltage is unlikely to have an impact on reducing the image quality of the print image. Thus, in the image quality priority mode, the image quality of the print image is unlikely to deteriorate more than in the first print mode as a result of the reduction or increase in the head drive voltage.

Non-Printing Scanning Depending on Head Temperature

"Non-printing scanning depending on the head temperature" indicates whether or not to perform the non-printing scanning depending on the head temperature during the printing, and, when it is decided whether or not to perform the non-printing scanning depending on the head temperature, indicates a reference temperature of the head temperature. With respect to the "non-printing scanning depending on the head temperature," the control content definition table 49 sets out "No" for the first print mode and the productivity priority mode, and sets out "head temperature is higher than reference temperature" for the image quality priority mode, for example. "No" indicates that the non-printing scanning is not be performed depending on the head temperature during the printing. "Head temperature is higher than reference temperature" indicates that the non-printing scanning is to be performed during the printing when the head temperature has become higher than the reference temperature.

The reference temperature is not limited to a particular temperature, and is 30° C., for example. The reference temperature may be higher than an upper limit of the reference temperature range, or may be lower than the upper limit, but is, for example, the same as the upper limit of the reference temperature range. The reference temperature may be lower than a lower limit of the reference temperature range, or may be the same as the lower limit, but is, for example, higher than the lower limit of the reference temperature range. In the image quality priority mode, the non-printing scanning may be performed a higher number of times than in the first print mode. When the number of times the non-printing scanning is performed is high, the processing time period becomes longer. Thus, in the image quality priority mode, there is a case in which the head power consumption is reduced compared to the first print mode, due to the increase in the processing time period caused by the non-printing scanning performed depending on the head temperature. The increase in the non-printing scanning is unlikely to have an impact on the image quality of the print image. Thus, in the image quality priority mode, the image quality of the print image is unlikely to deteriorate more than in the first print mode as a result of the increase in the non-printing scanning. Thus, in this case, the image quality of the print image is less likely to deteriorate in the image quality priority mode than in the productivity priority mode.

Non-Printing Scanning after End of Printing

"Non-printing scanning after the end of printing" indicates whether or not, after the end of the printing, the non-printing scanning is to be performed during a period in which the platen 15 is conveyed from a printing position to a set position. When the printing ends, the platen 15 is conveyed from the printing position to the set position. The printing position is a position at which the platen 15 faces the head 25 in the up-down direction. The set position is a position at which the platen 15 is separated, to the front, from the printing position. When the platen 15 is in a state of being positioned at the set position, the user removes the print medium, on which the printing has been performed, from the platen 15, and attaches the print medium before the printing to the platen 15.

With respect to the "non-printing scanning after the end of printing," the control content definition table 49 sets out "No" for the first print mode, and sets out "Yes" for the image quality priority mode and the productivity priority mode, for example. "No" indicates that the non-printing scanning is not performed in the period in which the platen 15 is conveyed from the printing position to the set position, after the end of the printing. "Yes" indicates that the non-printing scanning is to be performed in the period in which the platen 15 is conveyed from the printing position to the set position, after the end of the printing.

Due to the scanning of the head 25, air is blown relative to the head 25. As a result of this, the head temperature is lowered. Thus, in the image quality priority mode and the productivity priority mode, the head temperature becomes lower than in the first print mode, due to the non-printing scanning after the end of the printing.

According to the configuration of the above-described control content definition table 49, of each of the control content as a whole, in each of the image quality priority mode and the productivity priority mode, the head power consumption is reduced compared to the first print mode. As a result, of each of the control content as a whole, in each of the image quality priority mode and the productivity priority mode, the heat in the head 25 is suppressed more than in the first print mode.

Figure 6:
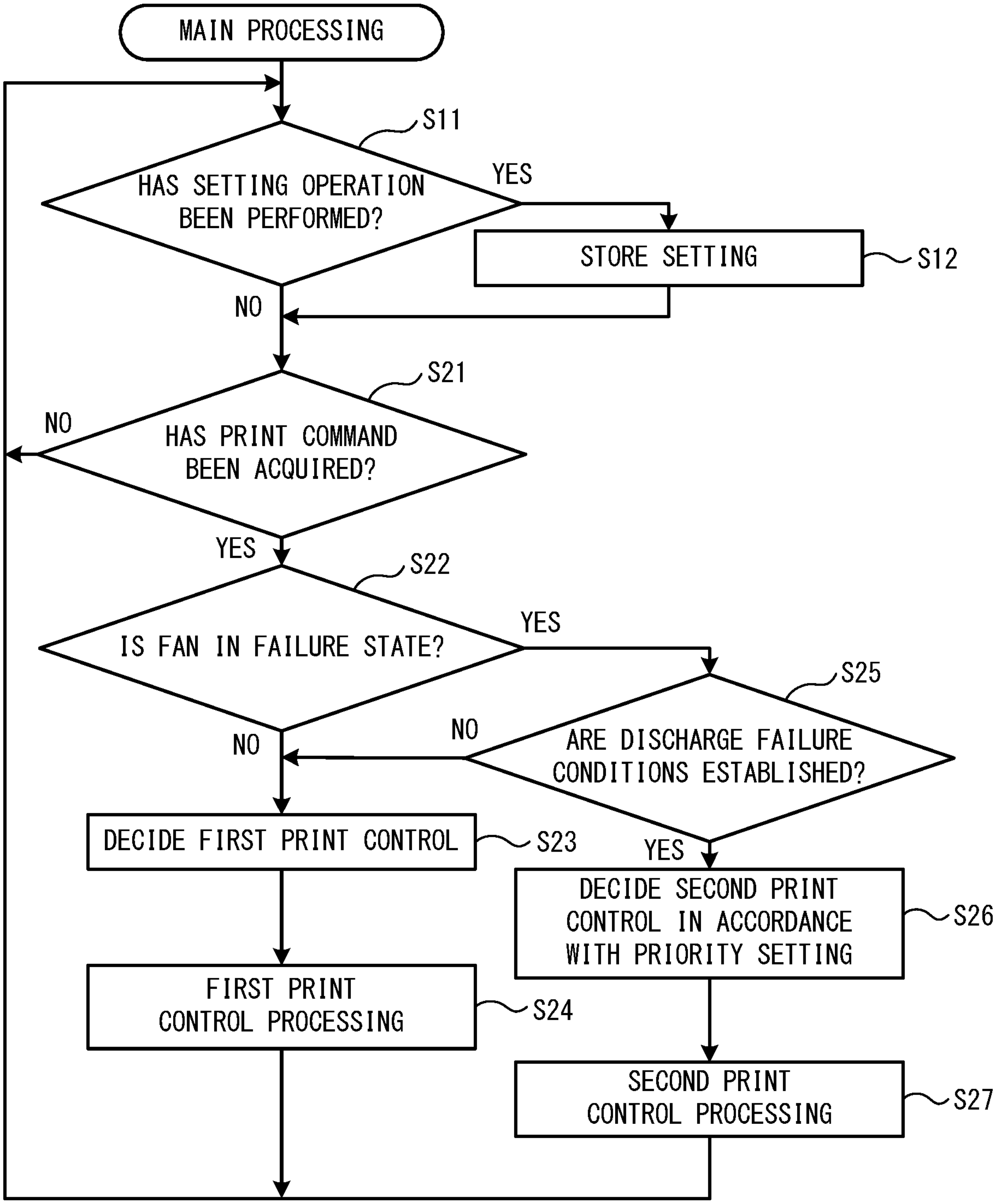
FIG. 6 is a flowchart of main processing.

Main processing will be explained with reference to FIG. 6. When the power supply of the printer 1 is turned on, the CPU 41 performs the main processing by reading out and operating the control program from the ROM 42.

The CPU 41 determines whether or not, on the operation portion 37, a setting operation for priority settings has been performed (step S11). When the setting operation has not been performed (no at step S11), the CPU 41 shifts the processing to step S21.

In the present embodiment, an image quality priority setting and a productivity priority setting are provided as the priority settings. When setting the image quality of the print image as a priority over the productivity of the printing, the user performs the setting operation to select the image quality priority setting. When setting the productivity of the printing as a priority over the image quality of the print image, the user performs the setting operation to select the productivity priority setting. When the setting operation has been performed (yes at step S11), the CPU 41 stores one of the image quality priority setting or the productivity priority setting in the flash memory 44 in accordance with the setting operation (step S12).

The CPU 41 determines whether or not the print command has been acquired via the operation portion 37 (step S21). When the print command has not been acquired (no at step S21), the CPU 41 returns the processing to step S11. When the print command has been acquired (yes at step S21), the CPU 41 determines, based on the detection signal from the detection sensor 341, whether or not the fan 29 is in the failure state (step S22).

When the voltage value indicated by the detection signal from the detection sensor 341 is smaller than the voltage reference value, the CPU 41 determines that the fan 29 is not in the failure state (no at step S22). In this case, the CPU 41 decides a first print control as the print control to be performed by the CPU 41 (step S23). For example, the CPU 41 refers to the control content definition table 49 shown in FIG. 5 and decides the control content according to the first print mode. The CPU 41 acquires the print data specified by the print command from the flash memory 44, and performs first print control processing (step S24). The CPU 41 returns the processing to step S11.

In the first print control processing (step S24), the CPU 41 drives the fan motor 34 shown in FIG. 3, and rotates the fan 29 shown in FIG. 2. In the state in which the fan 29 is being caused to rotate, the CPU 41 controls the main scanning motor 31, the sub-scanning motor 32, and the head driver 35 shown in FIG. 3, and controls the printing by the head 25 shown in FIG. 2, in the first print mode. For example, the CPU 41 controls the printing by the head 25 using the control content (refer to FIG. 5) decided at step S23. In other words, the CPU 41 conveys the platen 15 shown in FIG. 1 from the set position to the printing position, and performs the bi-directional printing.

The CPU 41 performs the printing such that the first resolution is obtained. The CPU 41 outputs the pulse signal having the first number of pulses to the head driver 35. The CPU 41 moves the carriage 23 shown in FIG. 1 in the left-right direction at the first speed. The CPU 41 stops the carriage 23 for the first time period, from ending one scan of the head 25 until starting the next scan. The CPU 41 controls the head drive voltage regardless of the head temperature. When the printing is ended, the CPU 41 conveys the platen 15 shown in FIG. 1 from the printing position to the set position. The CPU 41 controls the cap motor 33 shown in FIG. 3, and covers the nozzle surface 26 shown in FIG. 2 from below, using the cap 17 shown in FIG. 1. The CPU 41 ends the first print control.

At step S22, when the voltage value indicated by the detection signal from the detection sensor 341 is equal to or greater than the voltage reference value, the CPU 41 determines that the fan 29 is in the failure state (yes at step S22). In this case, the CPU 41 determines whether or not discharge failure conditions, which are used to decide between the first print mode and the second print mode, have been established (step S25). When the discharge failure conditions have been established, compared to when the discharge failure conditions have not been established, there is a higher possibility of the discharge failure of the ink by the head 25 during printing. In other words, the discharge failure conditions are conditions under which, when the discharge failure conditions are established, compared to when the discharge failure conditions are not established, the possibility of the discharge failure of the ink by the head 25 during printing is higher.

The discharge failure conditions are configured by a DUTY condition and a temperature condition, for example, and are established when one or both of the DUTY condition and the temperature condition are established. The DUTY condition is established when an overall print DUTY exceeds a predetermined DUTY reference value. The DUTY reference value is not limited to a particular value, and is 200%, for example.

The print DUTY is a parameter indicating a degree of overlap printing, for example. For example, a print region is defined as a region on the print medium in which dots can be formed by one discharge scan. The print region is rectangular. A length of the print region in the front-rear direction is the same as a distance between a front end and a rear end of the plurality of nozzle openings 28 in the head 25. A plurality of the print regions are aligned in the front-rear direction on the print medium. The print image is printed on the print medium by the dot pattern based on the print data being formed in each of the print regions.

In the present embodiment, the print DUTY of the single print region is 100% when, in the single print region, the dot pattern is formed by the one discharge scan, and is 200% when the dot pattern is formed by two of the discharge scans. In other words, when the print duty is 200%, in the single print region, the dot pattern is formed by the second discharge scan on top of the dot pattern formed by the first discharge scan. The overall print DUTY is a parameter based on the print DUTY of each of the print regions, and is an average value, a maximum value, or a median value of the print DUTY of each of the print regions.

At step S25, the CPU 41 acquires, from the flash memory 44, the print data specified by the print command. The CPU 41 identifies the overall print DUTY, based on the acquired print data. The CPU 41 determines whether or not the DUTY conditions are established, depending on whether or not the identified overall print DUTY exceeds the DUTY reference value.

The temperature condition is established when the temperature detected by the temperature sensor 36, that is, the head temperature, exceeds a predetermined temperature reference value. At step S25, the CPU 41 acquires the head temperature from the temperature sensor 36. The CPU 41 determines whether or not the temperature condition has been established, depending on whether or not the acquired head temperature exceeds the temperature reference value.

When the discharge failure conditions are not established (no at step S25), as described above, the CPU 41 decides the first print control as the print control to be performed (step S23). The CPU 41 acquires, from the flash memory 44, the print data specified by the print command, and performs the above-described first print control processing (step S24). The CPU 41 returns the processing to step S11.

When the discharge failure conditions are established (yes at step S25), the CPU 41 decides the second print control as the print control to be performed depending on the priority setting (step S26). When the image quality priority setting is stored in the flash memory 44, the CPU 41 decides the second print control in the image quality priority mode. In this case, the CPU 41 refers to the control content definition table 49 shown in FIG. 5 and decides the control content in accordance with the image quality priority mode. When the productivity priority setting is stored in the flash memory 44, the CPU 41 decides the second print control in the productivity priority mode. In this case, the CPU 41 refers to the control content definition table 49 shown in FIG. 5 and decides the control content in accordance with the productivity priority mode. The CPU 41 acquires, from the flash memory 44, the print data specified by the print command, and performs second print control processing (step S27). The CPU 41 returns the processing to step S11.

By the second print control in the image quality priority mode, the CPU 41 does not drive the fan motor 34 shown in FIG. 3. The CPU 41 controls the main scanning motor 31, the sub-scanning motor 32, and the head driver 35 shown in FIG. 3, and controls the printing by the head 25 shown in FIG. 2, in the image quality priority mode. For example, the CPU 41 controls the printing by the head 25, using the control content (refer to FIG. 5) decided at step S26. In other words, the CPU 41 acquires the head temperature from the temperature sensor 36 shown in FIG. 3, and determines whether or not the acquired head temperature is within the reference temperature range. When the head temperature is not within the reference temperature range, the CPU 41 stands by until the head temperature is within the reference temperature range. When the head temperature is within the reference temperature range, the CPU 41 starts the printing.

The CPU 41 conveys the platen 15 shown in FIG. 1 from the set position to the printing position, and performs the uni-directional printing. The CPU 41 performs the printing such that the first resolution is obtained. The CPU 41 outputs the pulse signal having the first number of pulses to the head driver 35. The CPU 41 moves the carriage 23 shown in FIG. 1 in the left-right direction at the second speed. The CPU 41 stops the carriage 23 for the second time period, from ending one scan of the head 25 until starting the next scan.

The CPU 41 continuously acquires the head temperature from the temperature sensor 36 shown in FIG. 3, and controls the head drive voltage in accordance with the acquired head temperature. Furthermore, each time the scan of the head 25 is performed a predetermined number of times, the CPU 41 determines whether or not the acquired head temperature is higher than the reference temperature. The predetermined number of times may be 1, or may be a plurality of times. When the head temperature is higher than the reference temperature, at the next scan of the head 25, the CPU 41 performs the non-printing scanning. When the head temperature is equal to or lower than the reference temperature, the CPU 41 performs the next scan of the head 25 based on the control of the uni-directional printing.

When the printing ends, the CPU 41 conveys the platen 15 shown in FIG. 1 from the printing position to the set position. The CPU 41 performs the non-printing scanning during the period in which the platen 15 is conveyed from the printing position to the set position. The CPU 41 controls the cap motor 33 shown in FIG. 3, and covers the nozzle surface 26 shown in FIG. 2 from below, using the cap 17 shown in FIG. 1. The CPU 41 ends the second print control in the image quality priority mode.

By the second control in the productivity priority mode, the CPU 41 does not drive the fan motor 34 shown in FIG. 3. The CPU 41 controls the main scanning motor 31, the sub-scanning motor 32, and the head driver 35 shown in FIG. 3, and controls the printing by the head 25 shown in FIG. 2, in the productivity priority mode. For example, the CPU 41 controls the printing by the head 25, using the control content (refer to FIG. 5) decided at step S26. In other words, the CPU 41 conveys the platen 15 shown in FIG. 1 from the set position to the printing position, and performs the bi-directional printing.

The CPU 41 performs the printing such that the second resolution is obtained. The CPU 41 outputs the pulse signal having the second number of pulses to the head driver 35 shown in FIG. 3. The CPU 41 moves the carriage 23 shown in FIG. 1 in the left-right direction at the first speed. The CPU 41 stops the carriage 23 for the first time period, from ending one scan of the head 25 until starting the next scan. The CPU 41 continuously acquires the head temperature from the temperature sensor 36 shown in FIG. 3, and controls the head drive voltage in accordance with the acquired head temperature.

When the printing ends, the CPU 41 conveys the platen 15 shown in FIG. 1 from the printing position to the set position. The CPU 41 performs the non-printing scanning during the period in which the platen 15 is conveyed from the printing position to the set position. The CPU 41 controls the cap motor 33 shown in FIG. 3, and covers the nozzle surface 26 shown in FIG. 2 from below, using the cap 17 shown in FIG. 1. The CPU 41 ends the second print control in the productivity priority mode.

As described above, the printer 1 is provided with the head 25, the fan 29, the detection sensor 341, and the CPU 41. The head 25 discharges the ink. The fan 29 cools the head 25. The detection sensor 341 detects the state of the fan 29 and outputs the detection signal. The CPU 41 performs decision processing that decides the print control, based on the detection signal output by the detection sensor 341. In the decision processing, when the detection signal does not indicate that the fan 29 is in the failure state, the CPU 41 drives the fan 29 and decides the first print control that controls the printing by the head 25 in the first print mode. In the decision processing, when the detection signal indicates that the fan 29 is in the failure mode, the CPU 41 decides the second print control that controls the printing by the head 25 in the second print mode. The second print mode is the print mode that suppresses the generation of heat more than in the first print mode. The CPU 41 performs print control processing that performs the print control decided by the decision processing.

When the failure state of the fan 29 is detected, in the second print control, the printing by the head 25 is controlled in the second print mode. In the second print mode, the generation of heat is suppressed compared to the first print mode. Thus, the printer 1 can suppress the discharge failure of the ink by the head 25.

In the decision processing, when the detection signal indicates the failure state of the fan 29, and when the discharge failure conditions are not established, the CPU 41 decides the first print control. In the decision processing, when the detection signal indicates the failure state of the fan 29, and the discharge failure conditions are established, the CPU 41 decides the second print control.

When the failure state of the fan 29 is detected, the printer 1 can control the printing by the head 25 using one of the first print control and the second print control, depending on whether or not the discharge failure conditions are established. When the failure state of the fan 29 is detected, if the discharge failure conditions are not established, the first print control is performed. In this case, the printer 1 can perform the printing without reducing the image quality of the print image or reducing the printing productivity, for example, even when the fan 29 is in the failure state. When the failure state of the fan 29 is detected, if the discharge failure conditions are established, the second print control is performed. In this case, the printer 1 can perform the printing while suppressing the discharge failure of the ink by the head 25.

The printer 1 is provided with the flash memory 44. The flash memory 44 stores one of the image quality priority setting and the productivity priority setting. In the decision processing, when, in a state in which the image quality priority setting is stored in the flash memory 44, the detection signal indicates that the fan 29 is in the failure state, the CPU 41 decides the second print control that controls the printing by the head 25 in the image quality priority mode as the second print mode. In the decision processing, when, in a state in which the productivity priority setting is stored in the flash memory 44, the detection signal indicates that the fan 29 is in the failure mode, the CPU 41 decides the second print control that controls the printing by the head 25 in the productivity priority mode as the second print mode.

The printer 1 can perform the printing in the image quality priority mode when the user prioritizes the image quality of the print image over the printing productivity, and can perform the printing in the productivity priority mode when the user prioritizes the printing productivity over the image quality of the print image.

In the decision processing, when the detection signal indicates that the fan 29 is in the failure state, the CPU 41 decides the second print control that controls the printing by the head 25 in the second print mode. The second print mode is the print mode in which the number of times the non-printing scanning is performed is greater than in the first print mode. The non-printing scanning is the scanning in which the head 25 moves in the main scanning direction without discharging the ink.

A time period during the execution of the non-printing scanning is a time period in which the ink is not discharged from the head 25. Thus, the greater the increase in the number of non-printing scans, the more the generation of heat by the head 25 is suppressed. The printer 1 can suppress the generation of heat by the head 25 by increasing the number of non-printing scans in the second print mode more than the non-printing scans in the first print mode.

In the decision processing, when the detection signal does not indicate that the fan 29 is in the failure state, the CPU 41 can drive the fan 29, and decide the first print control that controls the printing by the head 25 in the first print mode. The first print mode is the print mode that performs the bi-directional printing. The bi-directional printing is the printing method in which, in the main scanning direction, the discharge scanning is performed on both the forward pass and the return pass. The discharge scanning is the scanning in which the head 25 moves in the main scanning direction while discharging the ink. In the decision processing, when the detection signal indicates that the fan 29 is in the failure state, the CPU 41 decides the second print control that controls the printing by the head 25 in the image quality priority mode. The image quality priority mode is the print mode that performs the uni-directional printing. The uni-directional printing is the printing in which, in the main scanning direction, the discharge scanning is performed on one of the forward pass and the return pass, and the non-printing scanning is performed on the other of the forward pass and the return pass.

By performing the bi-directional printing, the printer 1 can improve the printing productivity more than with the uni-directional printing. On the other hand, by performing the uni-directional printing, the printer 1 can suppress the generation of heat by the head 25 more than with the bi-directional printing. When the fan 29 is in the failure state, the printer 1 performs the uni-directional printing. Thus, the printer 1 can suppress the discharge failure of the ink by the head 25.

In the decision processing, when the detection signal indicates that the fan 29 is in the failure state, the CPU 41 decides the second print control that controls the printing of the head 25 in the productivity priority mode. The productivity priority mode is the print mode in which the number of scans of the head 25 is the same as in the first print mode, and the number of dots is smaller than in the first print mode. The number of dots is the number of the dots formed on the print medium by the discharge of the ink by the head 25.

The more the number of scans increases, the worse the printing productivity. The more the number of dots decreases, the more the generation of heat by the head 25 is suppressed. The printer 1 can reduce the number of dots in the productivity priority mode compared to the number of dots in the first print mode, without changing the number of scans in the productivity priority mode from the number of scans in the first print mode. Thus, in the productivity priority mode, the printer 1 can suppress the generation of heat by the head 25, while suppressing a deterioration in the printing productivity.

When performing the print control by the print control processing, the CPU 41 discharges the ink from the head 25 in accordance with the number of pulses of the drive waveform. In the decision processing, when the detection signal indicates that the fan 29 is in the failure state, the CPU 41 decides the second print control that controls the printing by the head 25 in the productivity priority mode. The productivity priority mode is the print mode in which the number of pulses is smaller than in the first print mode.

The smaller the number of pulses, the more the generation of heat by the head 25 is suppressed. The printer 1 can decrease the number of pulses in the productivity priority mode compared to the number of pulses in the first print mode. Thus, in the productivity priority mode, the printer 1 can suppress the generation of heat by the head 25.

Various modifications can be made to the above-described disclosure. Each of modified examples to be described below can be respectively combined insofar as contradictions do not arise. For example, the head 25 may be a line head. In the above-described embodiment, the fan 29 is built into the interior of the head 25. In contrast to this, as long as the fan 29 is able to cool the head 25, the fan 29 may be provided on an outer wall of the head 25, on the carriage 23, or the like.

In the above-described embodiment, the temperature sensor 36 measures the temperature of the nozzle surface 26. In contrast to this, the temperature sensor 36 may measure the temperature of a portion, of the head 25, other than the nozzle surface 26. For example, the temperature sensor 36 may measure the temperature of a surface of the head 25 other than the nozzle surface 26, may measure the temperature of the atmosphere inside the head 25, or may measure the temperature of the ink flowing inside the head 25 or the temperature of a flow path.

In the above-described embodiment, when the current reference value is set to a value greater than 0 A, for example, the CPU 41 may drive the fan motor 34 and perform the second print control. In the above-described embodiment, the printer 1 may employ a sensor other than the lock sensor as the detection sensor 341. For example, the printer 1 may employ an optical sensor or the like as the detection sensor 341, and may detect the failure sate of the fan 29 in accordance with the rotation speed of the fan 29, or with the presence or absence of the rotation of the fan 29 when the fan motor 34 is driven. In this case, the detection sensor 341 does not only detect the failure state of the fan 29 due to a conduction defect of the fan motor 34, but can also detect the failure state of the fan 29 due to a failure of a connection portion between the fan motor 34 and the fan 29, for example. In the above-described embodiment, the detection sensor 341 outputs the detection signal indicating a voltage value to the CPU 41. In contrast to this, the detection sensor 341 may determine the failure state of the fan 29 on the basis of the voltage value and may output, to the CPU 41, the detection signal indicating a determination result.

In the above-described embodiment, the printer 1 may employ the head 25 that uses a thermal method, in place of the head 25 that uses the piezo method. In this case, the printer 1 employs a heating element, in place of the piezoelectric element, as the head driver 35. Other than the thermistor, the printer 1 may employ, as the temperature sensor 36, a thermocouple, thermography, or the like.

In the above-described embodiment, when the CPU 41 detects the failure state of the fan 29, the CPU 41 may decide to control the printing by the head 25 in the second print mode, regardless of whether or not the discharge failure conditions are established. In the above-described embodiment, the discharge failure conditions are established when one or both of the DUTY condition and the temperature condition are established. In contrast to this, the discharge failure conditions may be established only when both the DUTY condition and the temperature condition are established. The discharge failure conditions may be configured by only one of the DUTY condition and the temperature condition, may further include another condition, or may be configured by another condition in place of the DUTY condition and the temperature condition. The other condition includes humidity condition, and the like. The print DUTY may be a parameter indicating, in the single nozzle row 27, a ratio of the nozzle openings 28, of the plurality of nozzle openings 28, that discharge the ink simultaneously at the time of printing. The print DUTY may be a parameter indicating a discharge amount of the ink per unit time in printing of 1 cycle, that is, indicating a discharge frequency of the ink.

In the above-described embodiment, the control content definition table 49 is stored in the ROM 42. In contrast to this, the control content definition table 49 may be stored in the flash memory 44. In this case, a configuration may be adopted in which the CPU 41 can update the control content in the control content definition table 49 when an operation of the operation portion 37 by the user is received, for example. In the above-described embodiment, the printer 1 need not necessarily be provided with the image quality priority mode and the productivity priority mode as the second print mode. In this case, the storage area for storing the image quality priority setting and the productivity priority setting can be deleted from the flash memory 44. As the second print mode, the printer 1 may be provided with another mode in place of or in addition to the image quality priority mode and the productivity priority mode. In this case, in place of, or in addition to the image quality priority setting and the productivity priority setting, the flash memory 44 stores one of the priority settings according to the other mode, in accordance with the setting operation.

As long as the control content definition table 49 is configured such that the generation of heat can be suppressed in the second print mode more than in the first print mode, in each item of the control content, a different control method than that of the above-described embodiment may be set out for each of the items of the control content, and any of each of the items may be omitted. For example, in the image quality priority mode or the productivity priority mode, the CPU 41 may refer to the control content definition table 49 and may select some items of the plurality of control content items, in accordance with the image quality priority mode or the productivity priority mode. In this case, the control content that can be selected is different control content than the control content according to the first print mode. The control content that can be selected in the productivity priority mode is, for example, the resolution of the print image, the number of pulses, the head drive voltage control method, and the non-printing scanning after the end of printing. In this case, with respect to the control content that is not selected, the CPU 41 may perform the same control as in the first print mode. In the print method, for example, the control content definition table 49 may be configured such that the user can select, by an operation of the operation portion 37, one of the bi-directional printing and the uni-directional printing in the first print mode. In the print method, for example, the control content definition table 49 may set out the bi-directional printing in the image quality priority mode. The control content definition table 49 can change the print method in a similar manner with respect to the resolution of the print image, the number of pulses, the carriage speed, the interval between scans, the head drive voltage control method, the non-printing scanning according to the head temperature, and the non-printing scanning after the end of the printing.

In the above-described embodiment, in the image quality priority mode, for example, after the end of the printing, the non-printing scanning may be continuously performed even after the platen 15 has been disposed at the set position. In this case, the processing time period becomes longer. Thus, in the image quality priority mode, due to the increase in the processing time period as a result of the non-printing scanning after the end of the printing, the head power consumption is reduced compared to in the first print mode. In the above-described embodiment, with respect to the second print mode, in the image quality priority mode, for example, the non-printing scanning may be performed each time the head 25 has performed the scan a predetermined number of times.

In the above-described embodiment, the head drive voltage is the voltage value of the desired time period. In contrast to this, the head drive voltage may be an integrated value of the voltage within a predetermined duration. The predetermined period is a period, for example, from the start to the end of a discharge period of 1 cycle, for example.

In the above-described embodiment, the number of dots per single scan of the head 25 in the image quality priority mode is smaller than the number of dots per single scan of the head 25 in the first print mode. In contrast to this, the number of dots per all the scans of the head 25 in the image quality priority mode may be smaller than the number of dots per all the scans of the head in the first print mode. The number of dots per all the discharge scans of the head 25 in the image quality priority mode may be smaller than the number of dots per all the discharge scans of the head 25 in the first print mode. The number of dots per single discharge scan of the head 25 in the image quality priority mode may be smaller than the number of dots per single discharge scan of the head 25 in the first print mode.

In place of the CPU 41, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 42, the flash memory 44, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 42 or the flash memory 44. In this case, the control program may be stored in a non-transitory storage medium, such as an HDD provided in the server.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A printer comprising:

a head configured to discharge ink;

a fan configured to cool the head;

a sensor configured to output a detection signal indicating a state of the fan;

a processor; and a memory storing computer-readable instructions that, when executed by the processor, instruct the processor to perform processes comprising:

decision processing of deciding print control based on the detection signal output by the sensor, the decision processing including deciding a first print control to drive the fan and control printing by the head in a first print mode, when the detection signal does not indicate a failure state of the fan, and deciding a second print control to control the printing by the head in a second print mode suppressing generation of heat more than the first print mode, when the detection signal indicates the failure state of the fan; and print control processing of performing the print control decided by the decision processing wherein in the decision processing, the computer-readable instructions stored in the memory further instruct the processor to perform processes comprising:

deciding the first print control when the detection signal indicates the failure state of the fan and a discharge failure condition is not established, and deciding the second print control when the detection signal indicates the failure state of the fan and the discharge failure condition is established.

2. The printer according to claim 1 wherein in the decision processing, the computer-readable instructions stored in the memory further instruct the processor to perform a process comprising:

deciding, when the detection signal indicates the failure state of the fan, the second print control to control the printing by the head in the second print mode in which a number of scans of the head is the same as in the first print mode and in which a smaller number of dots is formed on a print medium by the discharge of the ink by the head than in the first print mode.

3. The printer according to claim 1 wherein in the print control processing, the computer-readable instructions stored in the memory further instruct the processor to perform a process comprising:

performing the print control to discharge the ink from the head in accordance with a number of pulses of a drive waveform, and in the decision processing, the computer-readable instructions stored in the memory further instruct the processor to perform a process comprising:

deciding, when the detection signal indicates the failure state of the fan, the second print control to control the printing by the head in the second print mode in which the number of pulses is smaller than in the first print mode.

4. A printer comprising:

a head configured to discharge ink;

a fan configured to cool the head;

a sensor configured to output a detection signal indicating a state of the fan;

a processor; and a memory storing computer-readable instructions that, when executed by the processor, instruct the processor to perform processes comprising:

decision processing of deciding print control based on the detection signal output by the sensor, the decision processing including deciding a first print control to drive the fan and control printing by the head in a first print mode, when the detection signal does not indicate a failure state of the fan, and deciding a second print control to control the printing by the head in a second print mode suppressing generation of heat more than the first print mode, when the detection signal indicates the failure state of the fan; and print control processing of performing the print control decided by the decision processing, the printer further comprising:

a storage storing an image quality priority setting or a productivity priority setting, wherein in the decision processing, the computer-readable instructions stored in the memory further instruct the processor to perform processes comprising:

deciding the second print control to control the printing by the head in an image quality priority mode as the second print mode, when the detection signal indicates the failure state of the fan in a state in which the image quality priority setting is stored in the storage, and deciding the second print control to control the printing by the head in a productivity priority mode as the second print mode, when the detection signal indicates the failure state of the fan in a state in which the productivity priority setting is stored in the storage.

5. The printer according to claim 4 wherein in the decision processing, the computer-readable instructions stored in the memory further instruct the processor to perform a process comprising:

deciding, when the detection signal indicates the failure state of the fan, the second print control to control the printing by the head in the second print mode in which a number of scans of the head is the same as in the first print mode and in which a smaller number of dots is formed on a print medium by the discharge of the ink by the head than in the first print mode.

6. The printer according to claim 4 wherein in the print control processing, the computer-readable instructions stored in the memory further instruct the processor to perform a process comprising:

performing the print control to discharge the ink from the head in accordance with a number of pulses of a drive waveform, and in the decision processing, the computer-readable instructions stored in the memory further instruct the processor to perform a process comprising:

deciding, when the detection signal indicates the failure state of the fan, the second print control to control the printing by the head in the second print mode in which the number of pulses is smaller than in the first print mode.

7. A printer comprising:

a head configured to discharge ink;

a fan configured to cool the head;

a sensor configured to output a detection signal indicating a state of the fan;

a processor; and a memory storing computer-readable instructions that, when executed by the processor, instruct the processor to perform processes comprising:

decision processing of deciding print control based on the detection signal output by the sensor, the decision processing including deciding a first print control to drive the fan and control printing by the head in a first print mode, when the detection signal does not indicate a failure state of the fan, and deciding a second print control to control the printing by the head in a second print mode suppressing generation of heat more than the first print mode, when the detection signal indicates the failure state of the fan; and print control processing of performing the print control decided by the decision processing, wherein in the decision processing, the computer-readable instructions stored in the memory further instruct the processor to perform a process comprising:

deciding, when the detection signal indicates the failure state of the fan, the second print control to control the printing by the head in the second print mode, the second print mode performing non-printing scanning a greater number of times than the first print mode, the non-printing scanning being scanning in which the head moves in a main scanning direction without discharging the ink.

8. The printer according to claim 7, wherein in the decision processing, the computer-readable instructions stored in the memory further instruct the processor to perform processes comprising:

deciding, when the detection signal does not indicate the failure state of the fan, the first print control to drive the fan and control the printing by the head in the first print mode, the first print mode performing bi-directional printing performing discharge scanning of the head moving in the main scanning direction while discharging the ink, in both a forward pass and a return pass in the main scanning direction, and deciding, when the detection signal indicates the failure state of the fan, the second print control to control the printing by the head in the second print mode, the second print mode performing uni-directional printing performing the discharge scanning in one of the forward pass and the return pass, and performing the non-printing scanning in the other of the forward pass and the return pass.

9. The printer according to claim 7 wherein in the decision processing, the computer-readable instructions stored in the memory further instruct the processor to perform a process comprising:

deciding, when the detection signal indicates the failure state of the fan, the second print control to control the printing by the head in the second print mode in which a number of scans of the head is the same as in the first print mode and in which a smaller number of dots is formed on a print medium by the discharge of the ink by the head than in the first print mode.

10. The printer according to claim 7 wherein in the print control processing, the computer-readable instructions stored in the memory further instruct the processor to perform a process comprising:

performing the print control to discharge the ink from the head in accordance with a number of pulses of a drive waveform, and in the decision processing, the computer-readable instructions stored in the memory further instruct the processor to perform a process comprising:

deciding, when the detection signal indicates the failure state of the fan, the second print control to control the printing by the head in the second print mode in which the number of pulses is smaller than in the first print mode.

11. A control method for a printer, the control method comprising:

decision processing of deciding print control based on a detection signal output by a sensor configured to output the detection signal indicating a state of a fan cooling a head configured to discharge ink, the decision processing including deciding a first print control to drive the fan and control printing by the head in a first print mode, when the detection signal does not indicate a failure state of the fan, and deciding a second print control to control the printing by the head in a second print mode that suppresses generation of heat more than the first print mode, when the detection signal indicates the failure state of the fan; and print control processing of performing the print control decided by the decision processing, wherein the decision processing includes:

deciding the first print control when the detection signal indicates the failure state of the fan and a discharge failure condition is not established, and deciding the second print control when the detection signal indicates the failure state of the fan and the discharge failure condition is established.

12. A non-transitory computer-readable medium storing computer-readable instructions that, when executed by a computer of a printer, instruct the computer to perform processes comprising:

decision processing of deciding print control based on a detection signal output by a sensor configured to output the detection signal indicating a state of a fan cooling a head configured to discharge ink, the decision processing including deciding a first print control to drive the fan and control printing by the head in a first print mode, when the detection signal does not indicate a failure state of the fan, and deciding a second print control to control the printing by the head in a second print mode that suppresses generation of heat more than the first print mode, when the detection signal indicates the failure state of the fan; and print control processing of performing the print control decided by the decision processing, wherein the decision processing includes:

deciding the first print control when the detection signal indicates the failure state of the fan and a discharge failure condition is not established, and deciding the second print control when the detection signal indicates the failure state of the fan and the discharge failure condition is established.

13. A non-transitory computer-readable medium storing computer-readable instructions that, when executed by a computer of a printer instruct the computer to perform processes comprising:

decision processing of deciding print control based on a detection signal output by a sensor configured to output the detection signal indicating a state of a fan cooling a head configured to discharge ink, the decision processing including deciding a first print control to drive the fan and control printing by the head in a first print mode, when the detection signal does not indicate a failure state of the fan, and deciding a second print control to control the printing by the head in a second print mode that suppresses generation of heat more than the first print mode, when the detection signal indicates the failure state of the fan; and print control processing of performing the print control decided by the decision processing, wherein the decision processing includes:

deciding the second print control to control the printing by the head in an image quality priority mode as the second print mode, when the detection signal indicates the failure state of the fan in a state in which the image quality priority setting is stored in the storage, and deciding the second print control to control the printing by the head in a productivity priority mode as the second print mode, when the detection signal indicates the failure state of the fan in a state in which the productivity priority setting is stored in the storage.

14. A non-transitory computer-readable medium storing computer-readable instructions that, when executed by a computer of a printer instruct the computer to perform processes comprising:

decision processing of deciding print control based on a detection signal output by a sensor configured to output the detection signal indicating a state of a fan cooling a head configured to discharge ink, the decision processing including deciding a first print control to drive the fan and control printing by the head in a first print mode, when the detection signal does not indicate a failure state of the fan, and deciding a second print control to control the printing by the head in a second print mode that suppresses generation of heat more than the first print mode, when the detection signal indicates the failure state of the fan; and print control processing of performing the print control decided by the decision processing, wherein the decision processing includes:

deciding, when the detection signal indicates the failure state of the fan, the second print control to control the printing by the head in the second print mode, the second print mode performing non-printing scanning a greater number of times than the first print mode, the non-printing scanning being scanning in which the head moves in a main scanning direction without discharging the ink.

* * * * *